US007536651B2

(12) United States Patent
Reiner

(10) Patent No.: US 7,536,651 B2
(45) Date of Patent: May 19, 2009

(54) COMPUTER-IMPLEMENTED METHODS AND SYSTEMS FOR ACCESSING DATA IN A COMPUTER SYSTEM BY A USER

(75) Inventor: Robert Reiner, Sandhausen (DE)

(73) Assignee: SAP AG, Walldorf (DE)

( * ) Notice: Subject to any disclaimer, the term of this patent is extended or adjusted under 35 U.S.C. 154(b) by 359 days.

(21) Appl. No.: 11/319,368

(22) Filed: Dec. 29, 2005

(65) Prior Publication Data

US 2006/0190479 A1    Aug. 24, 2006

(30) Foreign Application Priority Data

Dec. 29, 2004    (EP)    .................................    04030963

(51) Int. Cl.
*G06F 3/00*    (2006.01)
(52) U.S. Cl. .................................. 715/784; 707/103 R
(58) Field of Classification Search ................. 715/784, 715/785, 786, 787, 830; 707/103 R
See application file for complete search history.

(56) References Cited

U.S. PATENT DOCUMENTS

| 5,495,566 | A | 2/1996 | Kwatinetz | |
| 6,590,595 | B1* | 7/2003 | Wagner et al. | ............... 715/784 |
| 2002/0084981 | A1 | 7/2002 | Flack et al. | |
| 2002/0135602 | A1* | 9/2002 | Davis et al. | .................. 345/684 |
| 2002/0186251 | A1* | 12/2002 | Himmel et al. | ............. 345/784 |
| 2004/0077381 | A1 | 4/2004 | Engstrom | |
| 2007/0209018 | A1* | 9/2007 | Lindemann | .................. 715/784 |

FOREIGN PATENT DOCUMENTS

WO    WO 2004/097616 A1    11/2004

OTHER PUBLICATIONS

International Search Report and Written Opinion, mailed Dec. 6, 2005 (9 pages).

* cited by examiner

*Primary Examiner*—William L Bashore
*Assistant Examiner*—Meseker Takele
(74) *Attorney, Agent, or Firm*—Finnegan, Henderson, Farabow, Garrett & Dunner, LLP

(57) ABSTRACT

Methods and systems are provided for accessing, processing, and outputting data on a graphical output device for a user is provided. In one implementation, a method is provided that comprises presenting on the graphical output device a first portion of a data object in a window, wherein the data object contains a plurality of data object items, at least one of the data object items being sought by the user, and wherein the data object contains more data object items than being presentable in the window at a given moment in time. The method may further include providing on the graphical output device first and second control elements in relation to the presented data object, the first and second control elements being arranged to be activated by means of a user-operated input device in order to generate first and second request signals, respectively, upon such activation. Further, the method comprises effecting, upon generating respective first or second request signals, a scroll step into a direction corresponding to the respectively generated first and second request signals having a predetermined step size towards the data object item sought by the user, and presenting another portion of the data object in the window at least partially differing from the first portion of the data object, the step size between subsequently presented portions of the data object decreasing in proportion with the number of generated first or second request signals to effect a series of one or more scroll steps towards the sought data object item among the data object items.

21 Claims, 4 Drawing Sheets

COMPUTER-IMPLEMENTED METHODS AND SYSTEMS FOR ACCESSING DATA IN A COMPUTER SYSTEM BY A USER

TECHNICAL INVENTION

The present invention generally relates to computer-implemented methods and systems for accessing or identifying data in a computer system by a user. More particularly, the invention relates to methods and systems where data provided in one or more structured or unstructured objects (e.g., files, directories, lists, strings, objects, collections, etc.) or other data repositories is selected and displayed on a screen to be accessed or processed upon user interaction with the computer.

BACKGROUND INFORMATION

In information technology (IT) environments, large quantities of data object items are often presented on a screen of a computer to be accessed or selected by a user by interaction with the computer through a graphical user interface (GUI) device connected to the computer. However, it can be very difficult for the user to rapidly and easily identify the desired data object item on the screen. In a situation where the number or size of data object items to be "scanned" for a specific data object item by the user exceeds the space on the screen or the window/portion of the screen where the data object items are presented to the user, it is known to provide a scrolling function which allows for a linear (item by item) rolling up or down, or for a section-wise or page-wise rolling up or down. In other words, the user navigates up or down (or to either side in a horizontal orientation) through individual data object items of the data object in predetermined, fixed increments or steps. For long lists, such a serial browsing, this can be tedious and not very efficient.

In view of the foregoing, there is a need for a technical environment which allows for improved information management. More specifically, there is a need for appropriately configured network components like computer workstations and methods for controlling such network components which allow for a fast, efficient and user friendly identifying and accessing of data object items of the above-mentioned kinds.

SUMMARY OF THE INVENTION

According to embodiments of the invention, computer-implemented methods and systems are provided for accessing, processing, and outputting data on a graphical output device for a user. In accordance with one embodiment, a method is provided that comprises presenting on the graphical output device a first portion of a data object in a window, wherein the data object contains a plurality of "N" data object items, at least one of the "N" data object items being sought by the user, and wherein the data object contains more data object items than being presentable in the window at a given moment in time. The method may further comprise providing on the graphical output device first and second control elements in relation to the presented data object, the first and second control elements being arranged to be activated by a user-operated input device in order to generate first and second request signals, respectively, upon such activation. The method further includes effecting upon generating the respective first or second request signals, a scroll step into a direction corresponding to the respectively generated first and second request signals having a predetermined step size "s" towards the data object item sought by the user, and presenting another portion of the data object in the window at least partially differing from the first portion of the data object, the step size "s" between subsequently presented portions of the data object decreasing in proportion with the number of generated first or second request signals to effect a series of one or more scroll steps towards the sought data object item among the data object items.

Embodiments of the invention may allow for efficient data access and presentation of the accessed information. Further, embodiments of the invention may enhance the ease-of-use and contribute to a coherent presentation of the data.

Embodiments of the invention may provide for a more efficient "browsing" through a data object, as, on average, it reaches the sought data object item faster; that is, with less user interaction via the user-operated input device than conventional linear scrolling up or down.

In a preferred embodiment of the present invention, the data object contains the plurality of "N" data object items in a data structure, portions of which are being presented in one or more rows or columns in the window of the graphical output device.

The data object structure can be unsorted or sorted in accordance with one or more criteria. Preferably, in the case of an unsorted object structure, embodiments of the invention also provide an additional control element being arranged to be activated by a user-operated input device in order to sort the items according to the desired criterion.

Embodiments of the invention are applicable for and can be utilized with data object structures of the most diverse kind, such as a list, a field, an array, a series of concatenated data objects, or the like.

In a preferred embodiment, the step size "s" between subsequently presented portions of the data object (DO) is approximately determined by the equation:

$$s = \frac{N}{\#RXQ * a}$$

wherein:

"s" defines the current step size;

"N" defines the total number data object items (DOI 1 . . . m);

"#RQX" defines the number of previously generated respective first or second request signals (RQ1, RQ2) to effect a series of one or more scroll steps towards the sought data object item (SDOI) among the data object items (DOI 1 . . . m); and "a" defines a fixed factor >1 (preferably a=2).

As used herein, the current step size is understood to be the increment from the portion of data object items presented at a certain point in time in the window to the (next) portion of data object items presented in the window after a first or second request signal has been generated in order to effect a scroll step into the corresponding direction.

Embodiments of the invention may allow for the first or second request signals being generated to effect a scroll towards the beginning or towards the end of the data object, respectively. It is understood that the beginning and the end can either be spaced apart from each other in a horizontal direction (by a plurality of columns) or in a vertical direction (by a plurality of rows or lines).

In one embodiment, the first and second control elements are provided on the graphical output device adjacent to the presented portion of the data object in the window, such as at a top, and at a bottom corner or at a left and at a right corner of the window in which the portion of the data object is presented.

In one embodiment, the size of the presented portions of the data object is approximately determined by the window size of the window.

Embodiments of the present invention are also related to computer-implemented systems for accessing, processing, and outputting data in a computer network comprising at least one computer that can be operated by a user and that is suited to run the software program as described above in accordance with user input actions, and which is provided with a computer program product for carrying methods consistent with the present invention.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Figure 1:
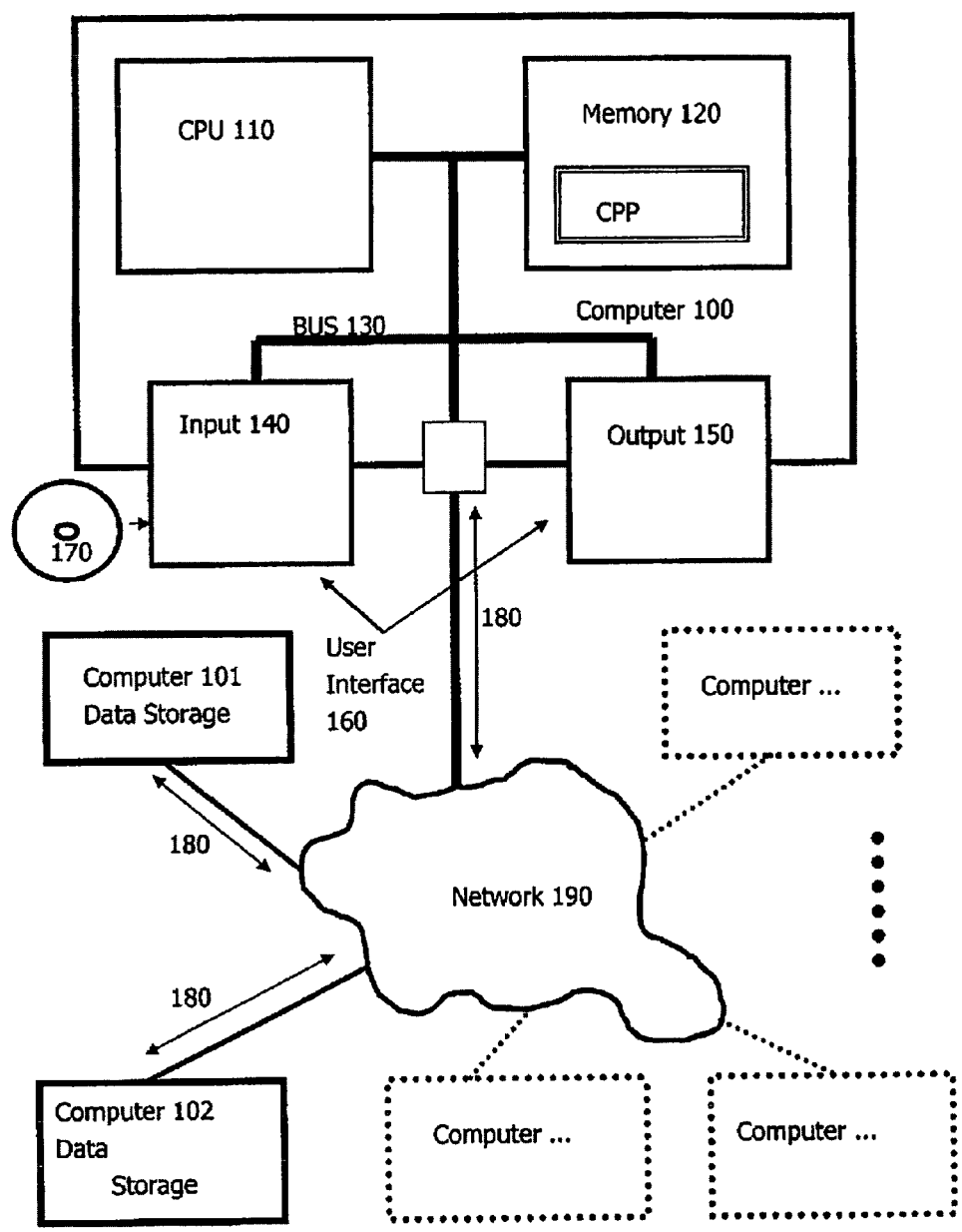
FIG. 1 is a schematic diagram illustrating an exemplary data processing system, in accordance with an embodiment of the present invention.

FIG. 1 illustrates a block diagram of an exemplary computer network system 10, in accordance with an embodiment of the present invention. The network system 10 includes a plurality of computer workstations 100, 101, 102. The computer workstations 100, 101, 102 can be coupled via a network 190 (such as an inter-computer network). Each computer workstation 100, 101, 102 comprises a processor 110 (such as a CPU), a memory 120, a bus 130, and, optionally, one or more input devices 140 and output devices 150 (I/O devices) acting as user interface 160, interoperating in a conventionally known manner. The present invention may be embodied in a computer program product (hereinafter CPP) residing on a program carrier 170 and/or the memory 120, and generating program signals 180, collectively called a "program."

The computer workstations 101, 102 may be implemented as "remote computers" in relation to computer 100. The computer workstations 101, 102 can be, for example, servers, routers, peer devices or other common network nodes, and typically may comprise many or all of the elements described with respect to the computer workstation 100. Hence, the elements 110-180 in the computer workstation 100 collectively illustrate also corresponding elements in the other computer workstations of the network 190.

The computer workstation 100 can be, for example, a conventional personal computer (PC), a desktop or a hand-held device, a multiprocessor computer, a microprocessor-based or programmable consumer electronics device, a minicomputer, a mainframe computer, a personal mobile computing device, a mobile telephone, a portable or stationary personal computer, a palmtop computer or the like.

The processor 110 can be, for example, a central processing unit (CPU), a micro-controller unit (MCU), digital signal processor (DSP), or the like. The memory 120 symbolizes elements or components that temporarily or permanently can store data and instructions. Although the memory 120 is conveniently illustrated as a part of the computer workstation 100, a memory function can also be implemented as a node in the network 190, in the other computers of the network, in the processor 110 itself (e.g., cache, register), or elsewhere.

The memory 120 can be a read only memory (ROM), a random access memory (RAM), or a memory with other access options or capabilities (e.g., a FLASH memory). The memory 120 may be physically implemented as machine-accessible media, such as, for example: magnetic media, like a hard disk, a floppy disk, or other magnetic disk, a tape, a cassette tape; optical media, like an optical disk (CD-ROM, digital versatile disk-DVD); semiconductor media, like DRAM, SRAM, EPROM, EEPROM, a memory stick, or by any other media. Optionally, the memory 120 is distributed across different media. Portions of the memory 120 can be removable or non-removable. For reading from media and for writing into media, the computer 100 may use devices well known in the art such as, for example, disk drives, tape drives, memory card or memory stick reader/writers, etc.

The memory 120 can store software program support modules such as, for example, a basic input output system (BIOS), an operating system (OS), a program library, a compiler, an interpreter, communication programs, driver, protocol converters, application software programs like text processors, (Internet) browsers, database applications, etc.

The CPP comprises program instructions and, optionally, data or variables that cause processor 110 to execute the steps of methods consistent with embodiments of the present invention. Exemplary method steps are explained in greater detail below. The CPP defines and controls the operation of the computer workstation 100 and its interaction in the network system 190. For example, and without the intention to be limiting, the CPP can be available as source code in any programming language, and as object code ("binary code") in a compiled presentation. Persons of ordinary skill in the art will appreciate that the CPP can be used in connection with any of the above-mentioned support modules.

Although the CPP is illustrated as being stored in memory 120, the CPP can also be located elsewhere. For example, the CPP can also be embodied on a program carrier 170.

The program carrier 170 is illustrated as being outside the computer workstation 100. For communicating the CPP to the computer 100, the program carrier 170 is conveniently inserted into the input device 140. The carrier 170 is implemented as any computer readable medium, such as one of the media explained above (cf. memory 120). Generally, the program carrier 170 is an article of manufacture comprising a computer readable medium having computer readable program code means embodied therein for executing methods consistent with the present invention. Further, the program signal(s) 180 can also embody the CPP. The signals 180 travel on the inter-computer network 190 to and from the computer workstation 100. The steps of the computer program product CPP can be executed solely in the computer workstation 100 or can be executed in a distributed manner in one or more of the computers in the network, respectively.

The input device 140 is a device that provides data and instructions for being processed by the computer workstation 100. For example, the device 140 can be a keyboard, a pointing device (e.g., mouse, trackball, cursor direction keys), microphone, joystick, game pad, etc. These devices require human interaction. The input device 140 can also serve to retrieve the program code of the CPP from the program carrier 170.

The output device 150 is a device that presents instructions and data that have been processed. It can be, for example, a monitor or display, cathode ray tube (CRT), flat panel display, liquid crystal display (LCD), or the like. Similar to the input device 140 above, the output device 150 mainly communicates with the user(s), but it can also communicate with further computers or devices.

The input device 140 and the output device 150 can be combined into a single device (e.g., a touch sensitive screen).

The input/output devices 140 and 150 are coupled to the computer workstation 100 by the bus 130 (as illustrated) or by the network 190 (optional). Interfaces coupled between the elements are also well known in the art. For simplicity, interfaces are not illustrated. An interface can be, for example, a serial port interface, a parallel port interface, a game port, a universal serial bus (USB) interface, an internal or external modem.

The functionalities of the computer and of the program are closely related. Phrases such as "the computer provides" or "the program provides," are used hereinafter to express actions by one or more computers that is/are controlled by a computer program product in accordance with embodiments of the invention. The software and the hardware infrastructure of embodiments of the invention may utilize the computer workstation 100 having the graphical display unit 150 and the graphical input unit 140, e.g., a mouse or a trackball. Alternatively, embodiments of the invention can also be utilized in a hardware infrastructure of the computer workstation 100 having the graphical display unit 150 an alphanumerical keyboard with arrow keys (up, down, left, or right).

The CPP, according to one embodiment of the present invention, can be part of a complex software system embedded in a hardware structure. In the following description, exemplary embodiments of the present invention will be presented with reference to the illustrations provided in the accompanying drawings.

Figure 4:
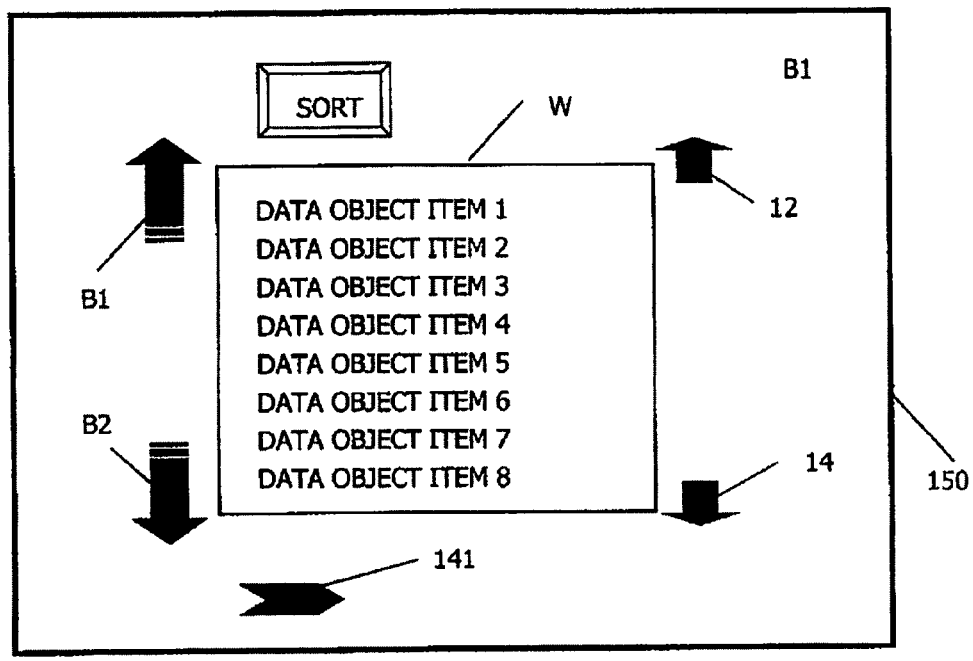
FIG. 4 is a schematic diagram illustrating an exemplary GUI that can be presented to a user, in accordance with an embodiment of the present invention.

On the computer workstation 100, a software code may be resident that includes a first program code portion for generating a GUI, such as that shown in the example of FIG. 4. The GUI in FIG. 4 has several control elements, so-called buttons (i.e., confined areas) on the display 150 that can be operated by a visible mouse pointer 141 which follows the movements carried out by the graphical input unit 140 (see FIG. 1).

Figure 2:
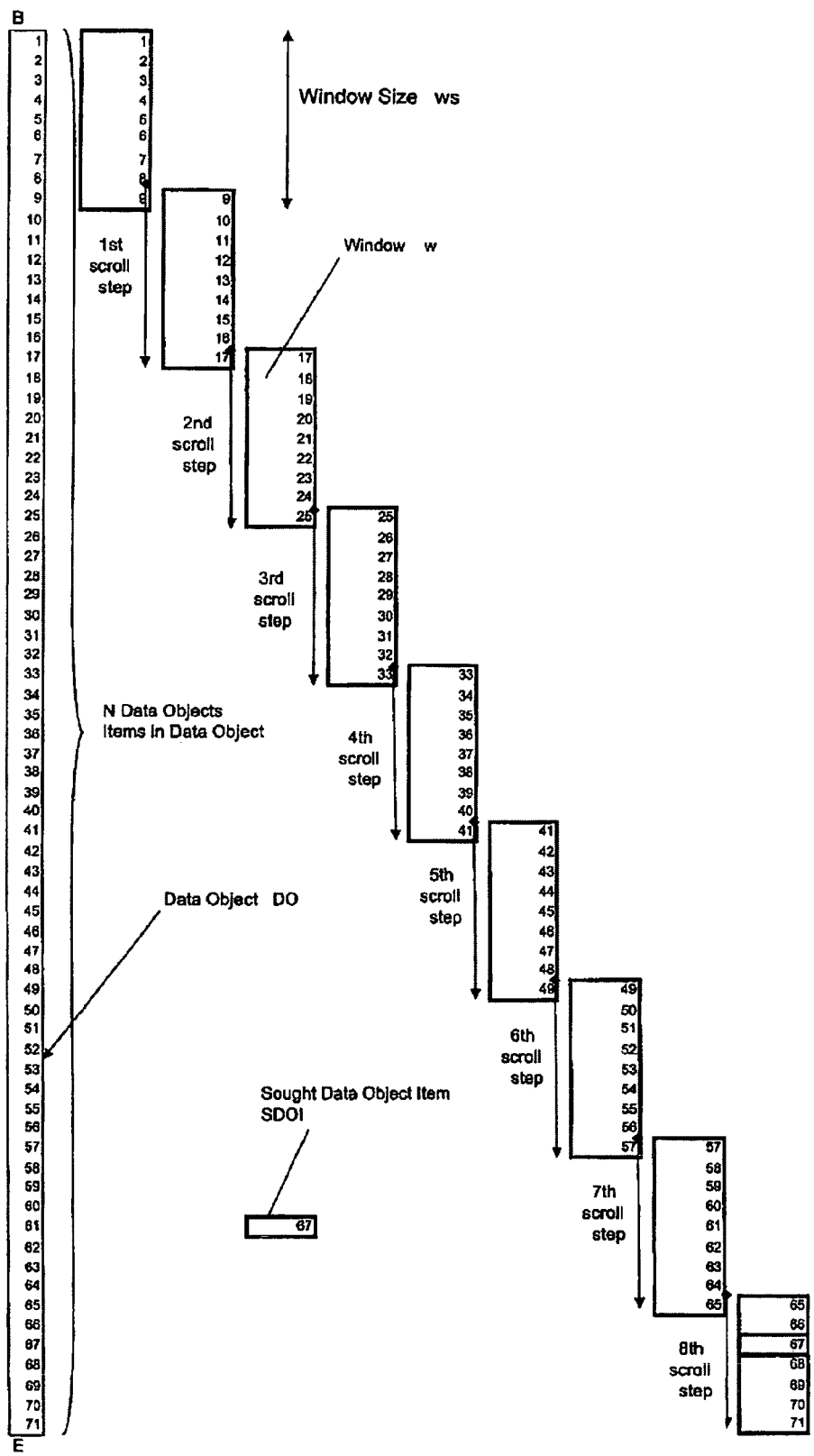
FIG. 2 illustrates an example of accessing data object items in accordance with a conventional methodology.

FIG. 2 illustrates a situation with a conventional scroll functionality. A window "w" provided on a display has a window size "ws" that is too small to present all the data object items of the data object DO. In the example of FIG. 2, the data object "DO" has 71 data object items, while the window "w" has a window size "ws" capable to present 8 data object items at a time. Assume for instance, that the user wants to access data object item 67. In order to reach this data object item, the user has to carry out a number of scrolling (down) steps by activating conventional respective up or down buttons 12 and 14 (see FIG. 4) next to the window "w."

This will cause the software code to present the next portion (in this instance 8) of the totality of the 71 data object items in the data object. The user has to repeat the activating of the down button eight times until the sought data object item SDOI (here 67) is visualized in the window "w."

In accordance with an embodiment of the invention and as depicted in FIG. 4, additionally to (or instead of) the buttons 12 and 14, first and second control elements B1 and B2 are provided on the screen 150 next to the data object DO presented in the window "w." These first and second control elements B1 and B2 are effectively similar to the buttons 12 and 14 described above. However, they provide a different functionality in so far as upon activation by a user they effect a scroll step into the desired direction which has a predetermined step size "s" towards the data object item sought (SDOI) which decreases in proportion with the number activations of the first and second control elements B1 and B2. Thereby a series of one or more scroll steps towards the sought data object item (SDOI) among the data object items is carried out where the "distance" between the portions of data object items visualized with each scroll step is reduced. To achieve this, upon the initial presentation of the data object in the window "w," a integer counter #RQX is set to 1. Each time a control element B1 or B2 is activated by the user, this counter is incremented by 1. Once the user has accessed the sought data object item, e.g., by double clicking on it, the counter can be reset.

Figure 3:
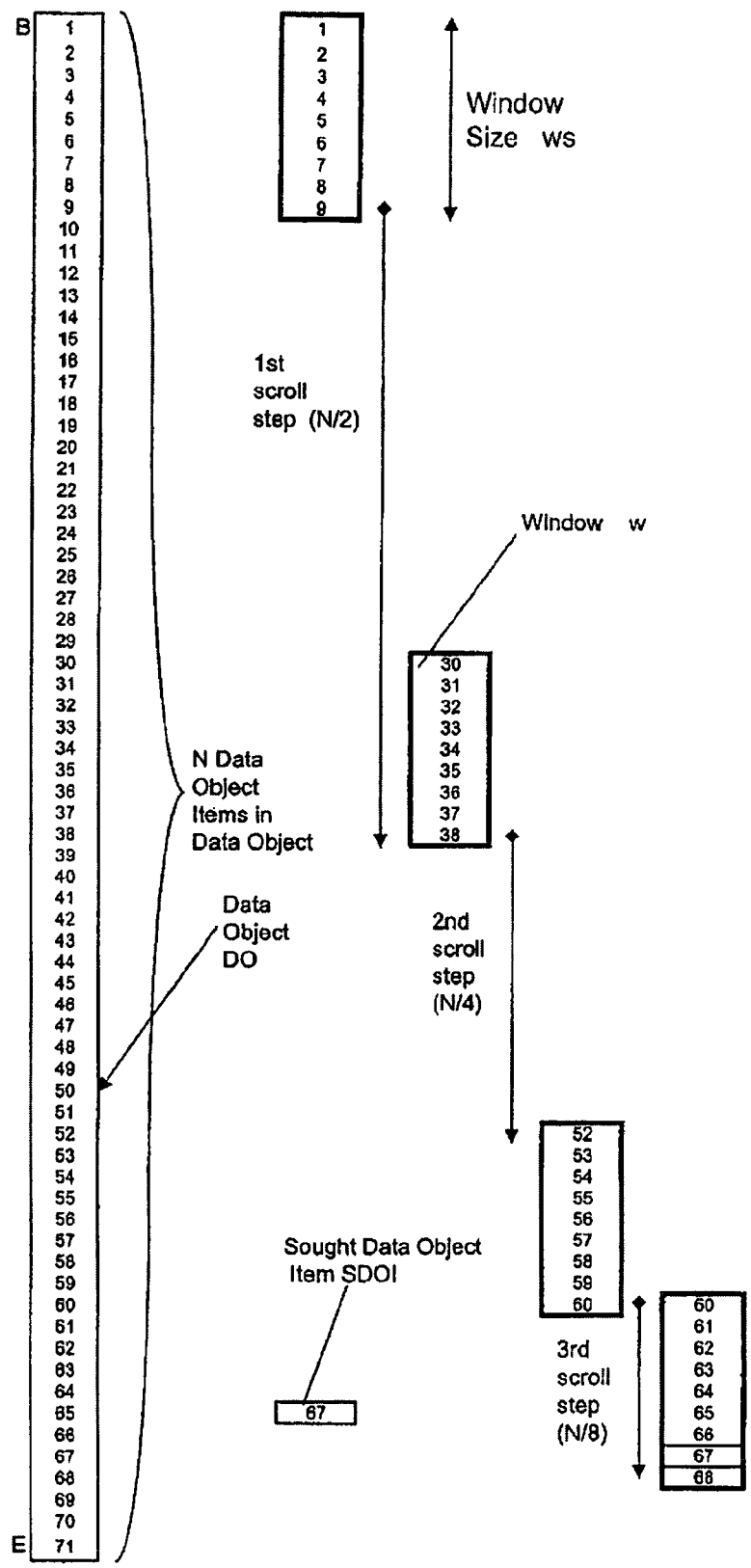
FIG. 3 illustrates an example of accessing data object items in accordance with a methodology consistent with an embodiment of the present invention.

In a preferred embodiment of the invention, the first step makes a jump approximately to the middle section of the data object, the second step jumps approximately a ¼ of the data object, (up or down, depending on which control element B1 or B2 is activated by the user), the third step is an ⅛ of the data object (again, up or down, depending on which control element B1 or B2 is activated by the user), and so forth until the sought data object item (here item 67) appears in the window presented to the user. Thus, the step size in the preferred embodiment is effectively halved with each up or down button activated by the user. The formula used to calculate the step size mentioned above (s=N/#RQX*a) includes a fixed factor "a." This factor sets the length ratio from one step to the next step. In order to obtain the above-described embodiment, the factor is a =2. This sequence of steps utilizing the functionality of the present invention is illustrated in the embodiment of FIG. 3. As is evident, while the conventional approach requires eight steps until the sought data object item SDOI (here item 67) appears in the window presented to the user, the embodiment of FIG. 3 requires only three steps to reach this sought data object item SDOI.

Software code consistent with the present invention may further include a program code portion for sorting the data object items of the data object in accordance with a criterion defined by the user. This facilitates the identifying and accessing of a specific data object. To provide this functionality, the software code may include a program code portion that provides a control element (button) SORT next to the visualized data object in the window "w" on the screen. When a user activated this button, a sorting algorithm program routine is carried out and the data object items will then be presented in accordance with the sorted order when the first and/or second control buttons are activated by the user.

While the invention has been described with reference to exemplary embodiments, those skilled in the art will understand that various changes may be made and equivalents may be substituted without departing from the scope of the invention. In addition, many modifications may be made to adapt a particular step or structure to the teachings of the invention without departing from its scope. Therefore, it is intended that the invention not be limited to the particular embodiments disclosed, but that the invention will include all embodiments falling within the scope of the appended claims.

Other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims.

What is claimed is:

1. A computer-implemented method of accessing, processing, and outputting data on a graphical output device for a user, the method comprising:

presenting on the graphical output device a first portion of a data object in a window, the data object containing a plurality of data object items, at least one of the data object items being sought by the user, the data object containing more data object items than being presentable in said window at a given moment in time;

providing on the graphical output device at least one control element, the control element being arranged to be activated by a user-operated input device in order to generate request signals upon such activation;

effecting, upon generating each of said request signals, a scroll step having a predetermined step size, towards the data object item sought by the user; and presenting another portion of the data object in the window at least partially differing from the first portion of the data object, the step size between subsequently presented portions of the data object decreasing automatically based on the number of user generated request signals and number of data object items remaining in a scroll direction to effect a set of scroll steps towards the sought data object item among the data object items.

2. The computer-implemented method according to claim 1, wherein the data object contains the plurality of data object items in a data structure, portions of which are presented in rows or columns in the window of the graphical output device.

3. The computer-implemented method according to claim 2, wherein the data object structure is unsorted or sorted in accordance with one or more criteria.

4. The computer-implemented method according to claim 3, wherein, in the case of an unsorted object structure, an additional control element is arranged to be activated by the user-operated input device in order to sort the plurality of data object items according to the desired criterion.

5. The computer-implemented method according to claim 2, wherein the data object structure is a list, a field, an array, or a series of concatenated data objects.

6. The computer-implemented method according to claim 1, wherein the step size between subsequently presented portions of the data object is approximately determined by the equation:

$$s = \frac{N}{\#RXQ * a}$$

wherein:

"s" defines the current step size;
"N" defines the total number data object items;
RQX defines the number of previously generated request signals to effect a set of scroll steps towards the sought data object item among the data object items; and
a defines a fixed factor>1.

7. The computer-implemented method according to claim 1, wherein request signals are generated to effect a scroll towards the beginning or towards the end of the data object.

8. The computer-implemented method according to claim 1, wherein the control element is provided on the graphical output device adjacent to the presented portion of the data object in said window.

9. The computer-implemented method according to claim 1, wherein the size of the presented portions of the data object is approximately determined by the window size.

10. A computer-readable medium comprising executable instructions for performing a method, the method comprising: presenting on the graphical output device a first portion of a data object in a window, the data object containing a plurality of data object items, at least one of the data object items being sought by the user, the data object containing more data object items than being presentable in said window at a given moment in time;

providing on the graphical output device at least one control element, the control element being arranged to be activated by a user-operated input device in order to generate request signals upon such activation;

effecting, upon generating each of said request signals, a scroll step having a predetermined step size towards the data object item sought by the user; and presenting another portion of the data object in the window at least partially differing from the first portion of the data object, the step size between subsequently presented portions of the data object automatically decreasing based on the number of user generated request signals and number of data object items remaining in a scroll direction to effect a set of scroll steps towards the sought data object item among the data object items.

11. A computer system including a graphical output device, an input device with an input device indicator that is visible on the display and reflects movement of the input device, and a computer-readable medium on which is encoded instructions executable by a computer for displaying a window with contents on the graphical output device, the computer carrying out a method for displaying the contents of a window, the method comprising the steps of:

presenting on the graphical output device a first portion of a data object in a window, the data object containing a plurality of data object items, at least one of the data object items being sought by the user, the data object containing more data object items than being presentable in said window at a given moment in time;

providing on the graphical output device at least one control element, the control element being arranged to be activated by a user-operated input device in order to generate request signals upon such activation;

effecting, upon generating each of said request signals, a scroll step having a predetermined step size towards the data object item sought by the user; and presenting another portion of the data object in the window at least partially differing from the first portion of the data object, the step size between subsequently presented portions of the data object decreasing in proportion with the number of generated request signals to effect a set of scroll steps towards the sought data object item among the data object items, wherein the step size between subsequently presented portions of the data object is approximately determined by the equation:

$$s = \frac{N}{\#RXQ * a}$$

wherein:

"s" defines the current step size;

"N" defines the total number data object items;

RQX defines the number of previously generated request signals to effect a set of scroll steps towards the sought data object item among the data object items; and a defines a fixed factor>1.

12. The system according to claim 11, wherein the data object contains the plurality of data object items in a data structure, portions of which are presented in rows or columns in the window of the graphical output device.

13. The system according to claim 12, wherein the data object structure is unsorted or sorted in accordance with one or more criteria.

14. The system according to claim 13, wherein, in the case of an unsorted object structure, an additional control element is arranged to be activated by the user-operated input device in order to sort the plurality of data object items according to the desired criterion.

15. The system according to claim 12, wherein the data object structure is a list, a field, an array, or a series of concatenated data objects.

16. The system according to claim 11, wherein the request signals are generated to effect a scroll towards the beginning or towards the end of the data object.

17. The system according to claim 11, wherein the at least one control element is provided on the graphical output device adjacent to the presented portion of the data object in said window.

18. The system according to claim 11, wherein the size of the presented portions of the data object is approximately determined by the window size.

19. A method of presenting a plurality of data object items on a display device, the method comprising:

presenting on the display device a portion of the plurality of data object items in a window, the plurality of data object items containing more data object items than being presentable in said window at a given moment in time;

providing on the display device a control element, the control element being arranged to be activated by a user-operated input device to generate scroll step requests to move and update the plurality of data object items that are presented in said window; and presenting in response to scroll step requests generated by activating the control element, another portion of the plurality of data object items in said window, wherein a step size between subsequently presented portions of the data object items is variable and is first based on the total number of data object items and sizes of subsequent steps are automatically determined based on the number of received scroll step requests from a user and number of data object items remaining in a scroll direction.

20. The method of claim 19 wherein, the scroll step size decreases as the number of user scroll step requests increases and the number of data object items remaining in a scroll direction within the display decreases.

21. The method of claim 19, wherein the step size is approximately determined by the equation:

$$s = \frac{N}{\#RXQ * a}$$

wherein:

"s" defines the current step size;

"N" defines the total number data object items;

RQX defines the number of previously generated scroll step requests; and a defines a fixed factor>1.

* * * * *